Sept. 26, 1967     B. BURG     3,343,262

ARTIFICIAL DENTURE

Filed Feb. 1, 1965

INVENTOR:
BERNARD BURG
BY Edward C. Threedy
HIS ATTORNEY.

United States Patent Office 3,343,262
Patented Sept. 26, 1967

3,343,262
ARTIFICIAL DENTURE
Bernard Burg, 7756 Eastlake, Chicago, Ill. 60626
Filed Feb. 1, 1965, Ser. No. 429,306
10 Claims. (Cl. 32—2)

A principal object of my invention is in the provision in a denture of this character of a means for adjusting, removing or replacing one tooth of an artificial denture without the necessity of reconstructing the denture base.

Another object of my invention is in the provision in a device of this character of an artificial tooth construction which provides a means for adjusting the profile of the teeth relative to the denture base to achieve efficient mastication between opposing teeth.

Other objects will appear hereinafter.

The invention consists in the novel combination and arrangement of parts to be hereinafter described and claimed.

The invention will be understood by reference to the accompanying drawings showing the preferred form of construction, and in which.

For proper articulation and effective mastication of artificial dentures, it is imperative that the individual teeth are properly profiled with respect to each other and to opposing teeth.

Artificial teeth made of resinous plastic, much in use today, wear down rapidly causing improper mastication between opposing teeth, affecting the normal relationship between upper and lower jaws, causing distress to the user.

Despite the dental technician's best efforts, ideal articulation is extremely difficult to achieve because under moderate normal chewing stresses, the bone and flesh of the jaws, beneath artificial dentures, shrinks, causing disarticulation of the teeth.

To restore proper articulation and jaw relationship extensive and expensive procedures are required. The objects of my invention are to permit adjustment and replacements of each individual tooth in a denture quickly, conveniently and inexpensively.

Figure 2:
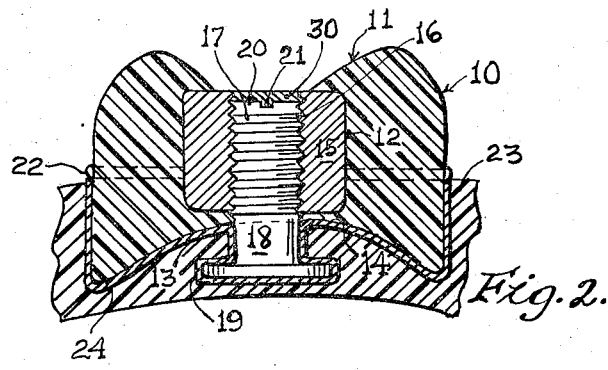
FIG. 2 is a sectional detailed view of my improved artificial tooth.

Referring to FIG. 2, I show a tooth 10, preferably made of porcelain or plastic having a valleyed crown 11. The body of the tooth 10 is formed with an enlarged recessed opening 12 normally having open communication with a passage 13 extending out of the bottom wall 14 of the tooth 10. Positioned within the opening 12 at the time of molding the artificial tooth is a metal insert 15. This insert 15 has formed therein an internally threaded bore 16 in alignment with the passage 13 formed in the bottom wall 14 of the tooth 10.

Threaded into the bore 16 is the threaded shank 17 of an adjustment member 18. This adjustment member 18 which is in the form of a small bolt is provided with an enlarged flat head 19 exterior of the bottom wall 14 of the tooth 10. The opposite flat end 20 of the threaded shank 17 of the member 18 is slotted as at 21 so as to receive a suitable tool for effecting axial rotation of the member 18 relative to the insert 15 for a purpose and in a manner hereinafter described.

Extending about the periphery of the tooth 10 is a small bead-like projection 22. This bead 22 is used as an indicator to effectively determine the position of the bottom wall 14 of the tooth and the enlarged head 19 of member 18 within the denture base 23.

Before the artificial tooth 10 and the adjusting member 18 are set into the denture base 23, the exposed exterior portions of these elements are covered with a nonadherent coating 24 so that the same will not become fixedly molded into the denture base 23. However, as noted in FIG. 2 by reason of the enlarged head 19 of the adjusting member 18 being embedded and embraced in the molded denture plate base 23, the tooth 10 may be properly positioned in the denture base 23.

Figure 1:
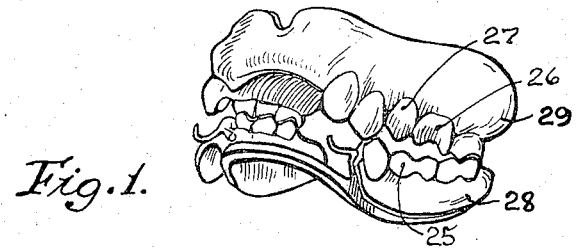
FIG. 1 is a perspective view of an improperly fitting denture.

As viewed in FIG. 1, the artificial teeth 25, 26, and 27 have either become worn by use or have been improperly set into their denture bases 28 and 29, respectively, so that they do not properly mate. To correct this position, a dental technician need only insert a proper tool in the slot 21 formed in the free end 20 of the adjusting member 18 and rotate the same so as to cause the threaded connection between the shank 17 thereof and the metal insert 15 to have threading movement therebetween. As the adjusting element 18 is free to rotate about its axis, but cannot become displaced axially because of its fixed position within the denture 23, the threaded connection between the shank 17 thereof and the metal insert 15 will cause the tooth 10 to move axially thereon and be raised or lowered relative to its denture base 23.

After the teeth have been properly aligned and/or mated, a suitable cap 30 may be placed over the solid end of the threaded shank 17 of the adjusting element 18 so that the tooth may have a finished or proper appearance.

Figure 3:
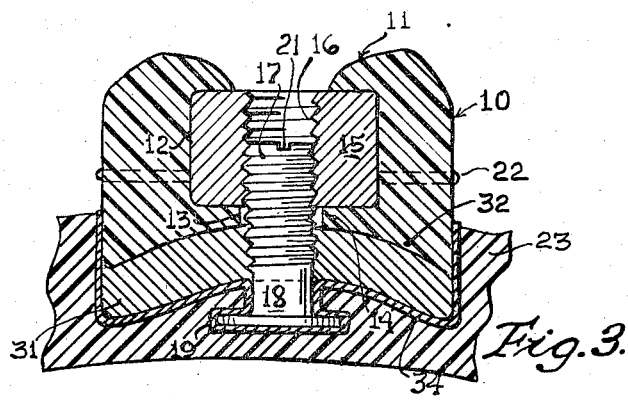
FIG. 3 is a sectional detailed view of a modified form of positioning my improved artificial tooth relative to the denture base.
Figure 4:
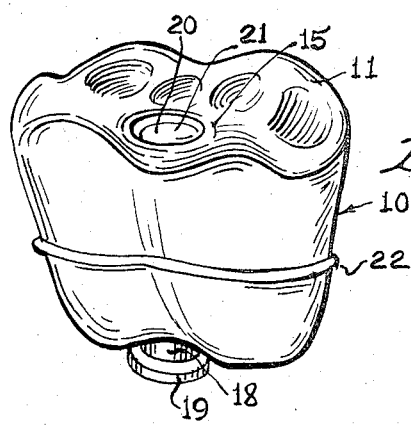
FIG. 4 is a perspective view of an artificial tooth of my invention.

With respect to FIG. 3, the artificial tooth is identical to that of FIG. 2 with the exception that there has been added a flexible spacing material 31 between the inner bottom edge 32 of the tooth and the contacting edge 33 of the denture base 34. This flexible filler 31 prevents unwanted spacing between the bottom edge of the artificial tooth and the denture upon adjustment thereof.

From the foregoing, it is readily apparent that in the event that the artificial tooth 10 may become chipped or broken, it can readily be removed and replaced without an expensive or extensive operation.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variation and modification as come within the scope of the appended claims.

Having thus described my invention, what I claim as new and desire to protect by Letters Patents is:

1. An artificial denture having a base plate supporting removable and adjustable teeth each comprising a molded tooth-like body,
    (a) said tooth-like body formed to provide in its top wall an enlarged opening entirely within the periphery of said tooth-like body, and a passage having open communication with said opening and extending out of the bottom wall of said tooth body,
    (b) an insert member confined within said opening and having an internally threaded center bore in alignment with said passage,
(c) threaded means projected through said passage into threaded engagement with said center bore of said insert member adjustably connecting said member and said body portion to said threaded means, and
(d) retaining means carried by said threaded means externally of said tooth-like body and embedded in said base plate for rotatably connecting said threaded means to the denture base plate,
(e) said threaded means having formed in its end portion projected into said insert member a transversely extending slot engageable by a suitable tool whereby said threaded means may be rotated relative to said base plate and said tooth-like body to axially move said tooth-like body relative thereto and to said denture base plate.

2. An artificial denture having a base plate supporting removable and adjustable teeth each comprising a molded tooth-like body,
(a) said tooth-like body formed to provide in its top wall an enlarged opening entirely within the periphery of said tooth-like body, and a passage having open communication with said opening and extending out of the bottom wall of said tooth body,
(b) an insert member confined within said opening and having an internally threaded center bore in alignment with said passage,
(c) threaded means projected through said passage into threaded engagement with said center bore of said insert member adjustably connecting said member and said body portion to said threaded means,
(d) retaining means carried by said threaded means externally of said tooth-like body and embedded in said base plate for rotatably connecting said threaded means to the denture base plate,
(e) said threaded means having formed in its end portion projected into said insert member a transversely extending slot engageable by a suitable tool whereby said threaded means may be rotated relative to said base plate and said tooth-like body to axially move said tooth-like body relative thereto and to said denture base plate, and
(f) a means in said opening formed in the top wall of said body covering said insert member and its threaded bore and the slotted end of said threaded means.

3. An artificial denture having a base plate supporting removable and adjustable teeth each comprising a molded tooth-like body,
(a) said tooth-like body formed to provide in its top wall an enlarged opening entirely within the periphery of said tooth-like body, and a passage having open communication with said opening and extending out of the bottom wall of said tooth body,
(b) an insert member confined within said opening and having an internally threaded center bore in alignment with said passage,
(c) threaded means projected through said passage into threaded engagement with said center bore of said insert member adjustably connecting said member and said body portion to said threaded means,
(d) retaining means carried by said threaded means externally of said tooth-like body and embedded in said base plate for rotatably connecting said threaded means to the denture plate base,
(e) said threaded means having formed in its end portion projected into said insert member a transversely extending slot engageable by a suitable tool whereby said threaded means may be rotated relative to said base plate and said tooth-like body to axially move said tooth-like body relative thereto and to said denture base plate, and
(f) an indicator means circumferentially extending about said tooth-like body to visually indicate the position of said body and said retaining means relative to said dental base plate.

4. An artificial denture having a base plate supporting removable and adjustable teeth each comprising a molded tooth-like body,
(a) said tooth-like body formed to provide in its top wall an enlarged opening entirely within the periphery of said tooth-like body, and a passage having open communication with said opening and extending out of the bottom wall of said tooth body,
(b) an insert member confined within said opening and having an internally threaded center bore in alignment with said passage,
(c) threaded means projected through said passage into threaded engagement with said center bore of said insert member adjustably connecting said member and said body portion to said threaded means,
(d) retaining means carried by said threaded means externally of said tooth-like body and embedded in said base plate for rotatably connecting said threaded means to the denture base plate,
(e) said threaded means having formed in its end portion projected into said insert member a transversely extending slot engageable by a suitable tool whereby said threaded means may be rotated relative to said base plate and said tooth-like body to axially move said tooth-like body relative thereto and to said denture base plate,
(f) a means in said opening formed in the top wall of said body covering said insert member and its threaded bore and the slotted end of said threaded means, and
(g) an indicator means circumferentially extending about said tooth-like body to visually indicate the position of said body and said retaining means relative to said dental base plate.

5. An artificial denture having a base plate supporting removable and adjustable teeth each comprising a molded tooth-like body,
(a) said tooth-like body formed to provide in its top wall an enlarged opening entirely within the periphery of said tooth-like body and a passage having open communication with said opening and extending out of the bottom wall of said tooth body,
(b) an insert member confined within said opening and having an internally threaded center bore in alignment with said passage,
(c) threaded means projected through said passage into threaded engagement with said center bore of said insert member adjustably connecting said member and said body portion to said threaded means,
(d) retaining means carried by said threaded means externally of said tooth-like body and embedded in said base plate for rotatably connecting said threaded means to the denture base plate,
(e) said threaded means having formed in its end portion projected into said insert member a transversely extending slot engageable by a suitable tool whereby said threaded means may be rotated relative to said base plate and said tooth-like body to axially move said tooth-like body relative thereto and to said denture base plate,
(f) a cap positionable in said opening formed in the top wall of said tooth-like body covering said insert member and its threaded bore and the slotted end of said threaded means, and
(g) a circumferentially extending bead on the side of said tooth-like body to visually indicate the position of said body relative to said threaded means embedded in said denture base plate.

6. An artificial denture having a base plate supporting removable and adjustable teeth each comprising a molded tooth-like body,
(a) said tooth-like body formed to provide in its top wall an enlarged opening entirely within the periphery of said tooth-like body, and a passage having open communication with said opening and extending out of the bottom wall of said tooth body,
(b) an insert member confined within said opening and having an internally threaded center bore in alignment with said passage,
(c) a bolt-like element having an elongated threaded shank projected through said passage into threaded engagement with said center bore of said insert member adjustably connecting said member and said body portion to said bolt-like element, and
(d) an enlarged substantially flat head carried by said bolt-like element externally of said tooth-like body and embedded in said base plate for rotatably connecting said bolt-like element to the denture base plate,
(e) said bolt-like element having formed in its end portion projected into said insert member a transversely extending slot engageable by a suitable tool whereby said bolt-like element may be rotated relative to said base plate and said tooth-like body to axially move said tooth-like body relative thereto and to said denture base plate.

7. An artificial denture having a base plate supporting removable and adjustable teeth each comprising a molded tooth-like body,
(a) said tooth-like body formed to provide in its top wall an enlarged opening entirely within the periphery of said tooth-like body, and a passage having open communication with said opening and extending out of the bottom wall of said tooth body,
(b) an insert member confined within said opening and having an internally threaded center bore in alignment with said passage,
(c) a bolt-like element having an elongated threaded shank projected through said passage into threaded engagement with said center bore of said insert member adjustably connecting said member and said body portion to said bolt-like element,
(d) an enlarged substantially flat head carried by said bolt-like element externally of said tooth-like body and embedded in said base plate for rotatably connecting said bolt-like element to the denture base plate,
(e) said bolt-like element having formed in its end portion projected into said insert member a transversely extending slot engageable by a suitable tool whereby said bolt-like element may be rotated relative to said base plate and said tooth-like body to axially move said tooth-like body relative thereto and to said denture base plate, and
(f) a means in said opening formed in the top wall of said body covering said insert member and its threaded bore and the slotted end of said bolt-like element.

8. An artificial denture having a base plate supporting removable and adjustable teeth each comprising a molded tooth-like body,
(a) said tooth-like body formed to provide in its top wall an enlarged opening entirely within the periphery of said tooth-like body, and a passage having open communication with said opening and extending out of the bottom wall of said tooth body,
(b) an insert member confined within said opening and having an internally threaded center bore in alignment with said passage,
(c) a bolt-like element having an elongated threaded shank projected through said passage into threaded engagement with said center bore of said insert member adjustably connecting said member and said body portion to said bolt-like element,
(d) an enlarged substantially flat head carried by said bolt-like element externally of said tooth-like body and embedded in said base plate for rotatably connecting said bolt-like element to the denture base plate,
(e) said bolt-like element having formed in its end portion projected into said insert member a transversely extending slot engageable by a suitable tool whereby said bolt-like element may be rotated relative to said base plate and said tooth-like body to axially move said tooth-like body relative thereto and to said denture base plate, and
(f) an indicator means circumferentially extending about said tooth-like body to visually indicate the position of said body and said enlarged substantially flat head relative to said dental base plate.

9. An artificial denture having a base plate supporting removable and adjustable teeth each comprising a molded tooth-like body,
(a) said tooth-like body formed to provide in its top wall an enlarged opening entirely within the periphery of said tooth-like body, and a passage having open communication with said opening and extending out of the bottom wall of said tooth body,
(b) an insert member confined within said opening and having an internally threaded center bore in alignment with said passage,
(c) a bolt-like element having an elongated threaded shank projected through said passage into threaded engagement with said center bore of said insert member adjustably connecting said member and said body portion to said bolt-like element,
(d) an enlarged substantially flat head carried by said bolt-like element externally of said tooth-like body and embedded in said base plate for rotatably connecting said bolt-like element to the denture base plate,
(e) said bolt-like element having formed in its end portion projected into said insert member a transversely extending slot engageable by a suitable tool whereby said bolt-like element may be rotated relative to said base plate and said tooth-like body to axially move said tooth-like body relative thereto and to said denture base plate.
(f) a means in said opening formed in the top wall of said body covering said insert member and its threaded bore and the slotted end of said bolt-like element, and
(g) an indicator means circumferentially extending about said tooth-like body to visually indicate the position of said body and said enlarged substantially flat head relative to said dental base plate.

10. An artificial denture having a base plate supporting removable and adjustable teeth each comprising a molded tooth-like body,
(a) said tooth-like body formed to provide in its top wall an enlarged opening entirely within the periphery of said tooth-like body and a passage having open communication with said opening and extending out of the bottom wall of said tooth body,
(b) an insert member confined within said opening and having an internally threaded center bore in alignment with said passage,
(c) a bolt-like element projected through said passage into threaded engagement with said center bore of said insert member adjustably connecting said member and said body portion to said bolt-like element,
(d) an enlarged substantially flat head carried by said bolt-like element externally of said tooth-like body and embedded in said pase plate for rotatably connecting said threaded means to the deture base plate,
(e) said bolt-like element having formed in its end portion projected into said insert member a transversely extending slot engageable by a suitable tool whereby said bolt-like element may be rotated relative to said base plate and said tooth-like body to axially move said tooth-like body relative thereto and to said denture base plate, (f) a cap positionable in said opening formed in the top wall of said tooth-like body covering said insert member and its threaded bore and the slotted end of said bolt-like element, and (g) a circumferentially extending bead on the side of said tooth-like body to visually indicate the position of said body relative to said threaded means embedded in said denture base plate.

References Cited

UNITED STATES PATENTS

| 1,665,154 | 4/1928 | Withycombe | 32—9 |
| 2,746,149 | 5/1956 | Del Papa | 32—10 |

RICHARD A. GAUDET, *Primary Examiner.*

ROBERT E. MORGAN, *Examiner.*